(12) United States Patent  (10) Patent No.: US 8,099,721 B2
Miceli  (45) Date of Patent: Jan. 17, 2012

(54) PARSING OF DECLARATIONS IN ALL BRANCHES OF PREPROCESSOR CONDITIONALS

(75) Inventor: Thierry Miceli, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 883 days.

(21) Appl. No.: 12/140,267

(22) Filed: Jun. 17, 2008

(65) Prior Publication Data

US 2009/0313604 A1  Dec. 17, 2009

(51) Int. Cl.
 *G06F 9/45* (2006.01)
(52) U.S. Cl. ........ 717/141; 717/129; 717/142; 717/143; 717/144; 712/234; 712/239
(58) Field of Classification Search .................. None
See application file for complete search history.

(56) References Cited

U.S. PATENT DOCUMENTS

| | | | |
|---|---|---|---|
| 5,148,532 A * | 9/1992 | Narita et al. ................ 712/245 |
| 5,276,880 A * | 1/1994 | Platoff et al. ................ 717/143 |
| 5,452,457 A | 9/1995 | Alpert et al. |
| 5,689,703 A * | 11/1997 | Atkinson et al. ................ 1/1 |
| 5,724,590 A * | 3/1998 | Goettelmann et al. ........ 717/154 |
| 5,768,564 A * | 6/1998 | Andrews et al. ............. 717/137 |
| 5,812,853 A | 9/1998 | Carroll et al. |
| 6,029,002 A * | 2/2000 | Afifi et al. ................... 717/131 |
| 6,031,993 A | 2/2000 | Andrews et al. |
| 6,128,774 A * | 10/2000 | Necula et al. ................ 717/146 |
| 6,178,548 B1 * | 1/2001 | Hickman et al. ............. 717/124 |
| 6,182,281 B1 | 1/2001 | Nackman et al. |
| 6,226,786 B1 * | 5/2001 | Hickman et al. ............. 717/124 |
| 6,317,871 B1 * | 11/2001 | Andrews et al. ............. 717/137 |
| 6,954,925 B1 * | 10/2005 | Kong ............................ 717/143 |
| 7,383,529 B2 * | 6/2008 | Gupta et al. .................. 716/104 |
| 7,818,729 B1 * | 10/2010 | Plum et al. ................... 717/140 |
| 2003/0163801 A1 | 8/2003 | Thames et al. |
| 2004/0268244 A1 * | 12/2004 | Levanoni et al. ............. 715/514 |
| 2006/0225052 A1 | 10/2006 | Waddington et al. |
| 2007/0006192 A1 * | 1/2007 | Grover et al. ................ 717/146 |
| 2007/0022414 A1 * | 1/2007 | Bird ............................. 717/143 |

OTHER PUBLICATIONS

Title: Syntax-directed construction of Value Dependence Graphs author: Byers, D. et al., source: IEEE, dated Nov. 9, 2001.*
Title: Context-Free-Grammar based Token Tagger in Reconfigurable Devices, author: Young H. Cho et al, source: IEEE, dated: Apr. 24, 2006.*
Garrido, et al., "Analyzing Multiple Configurations of a C Program", Proceedings of the 21st IEEE International Conference on Software Maintenance, Date: 2005, pp. 379-388, Publisher: IEEE Computer Society Washington, DC, USA.

(Continued)

*Primary Examiner* — Chameli Das

(57) ABSTRACT

Declarations from an input source code or tokenized source code are serialized into a stream of tokens produced by following each branch of a preprocessor conditional directive statement that interrupts a declaration. Tokens are labeled with a parsing path indicator corresponding to a parsing path induced by branches of a preprocessor conditional directive. The declarations that are formed along the different parsing paths are serialized by fetching the tokens that belong to the first parsing path in a first pass, and passing the tokens on to a next phase of a compiler. The pointer that marks the next token is repositioned to return to the start of the declaration. The declaration may be serialized again through the second parsing path in a second pass. The operation may be repeated until each of the parsing paths induced by the presence of branches of the preprocessor conditional directives in the source code is exhausted.

19 Claims, 6 Drawing Sheets

OTHER PUBLICATIONS

Garrido, et al., "Challenges of Refactoring C Programs", Proceedings of the International Workshop on Principles of Software Evolution, Date: 2002, pp. 6-14, Publisher: ACM New York, NY, USA.

"ctags(1)—Linux Man Page", http://linux.die.net/man/1/ctags, dated Apr. 24, 2008.

* cited by examiner

PARSING OF DECLARATIONS IN ALL BRANCHES OF PREPROCESSOR CONDITIONALS

BACKGROUND

When programming in some languages, it is a common practice to include constructs called preprocessor directives or preprocessor directive statements in the source code. Preprocessor directives are evaluated by a preprocessor before the source code is compiled. Typically, the source code with the preprocessor directives in it is provided to a preprocessor that takes the source code file with the preprocessor directives, makes appropriate substitutions and outputs a source code file without preprocessor directives. Because preprocessor directives are not legal code, the preprocessor directives have to be evaluated and removed before the source code will compile correctly.

A preprocessor can add useful features to the programming language in which the source code is written. For example, a preprocessor can receive configuration variables, and using the configuration variables, configure the program to run on a particular platform. There is also the potential for the preprocessor to output source code from which information available in the input source code has been lost. For example, to configure a program to run on a particular platform, typically the preprocessor evaluates preprocessor conditional directive statements. Based on the information provided in the configuration variables, the preprocessor selects a single branch of each preprocessor conditional directive statement to process and ignores the other branch or branches. Thus, information available in the other branches of the preprocessor conditional directive statements in the input source code may be lost when the source code is processed by the preprocessor.

The presence of the preprocessor directives in the input source code directs the preprocessor to perform certain operations, one of which is conditional compilation. Conditional compilation refers to a technique for compiling code selectively depending on the value of conditions evaluated during compilation.

In some programming languages (such as C, for example), preprocessor directive lines are those lines that start with a specified character or combination of characters. For C, for example, "#" denotes a preprocessor directive line. Conditional preprocessor directive lines in C source code are those that start with #if, #ifdef, #ifndef, #elif, #else, #endif. The text in between each preprocessor conditional directive line can be any text, including other preprocessor directives, or there may be no text in between preprocessor conditional directive lines. Standard C preprocessors evaluate the conditions and eliminate the text for which conditions are false, along with preprocessor conditional directive lines. Discarding the portions of code in the unprocessed branches can, however, result in errors.

SUMMARY

Declarations in each branch of a preprocessor conditional directive statement may be serialized into a stream of tokens produced by following all the parsing paths induced by the preprocessor conditional directives that interrupt the declaration. Because the serialization takes place at the level of the token stream, it is transparent to the syntax analysis parser so the serialization system and methods described herein are extendable to existing and future syntax analysis parsers.

Tokens may be labeled with a parsing path indicator corresponding to a parsing path induced by a branch of a preprocessor conditional directive statement. A token buffer may be generated that keeps track of which tokens belong to which parsing paths by labeling tokens with a parsing path indicator. The declarations that are formed along the different parsing paths may be serialized by fetching the tokens that belong to the first parsing path in a first pass and passing the tokens on to a caller. The pointer that marks the next token may then be repositioned to return to the start of the declaration. The declaration may be serialized again through the second parsing path in a second pass. The operation may be repeated until each of the parsing paths induced by the presence of branches of the preprocessor conditional directive statement(s) in the source code are exhausted.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
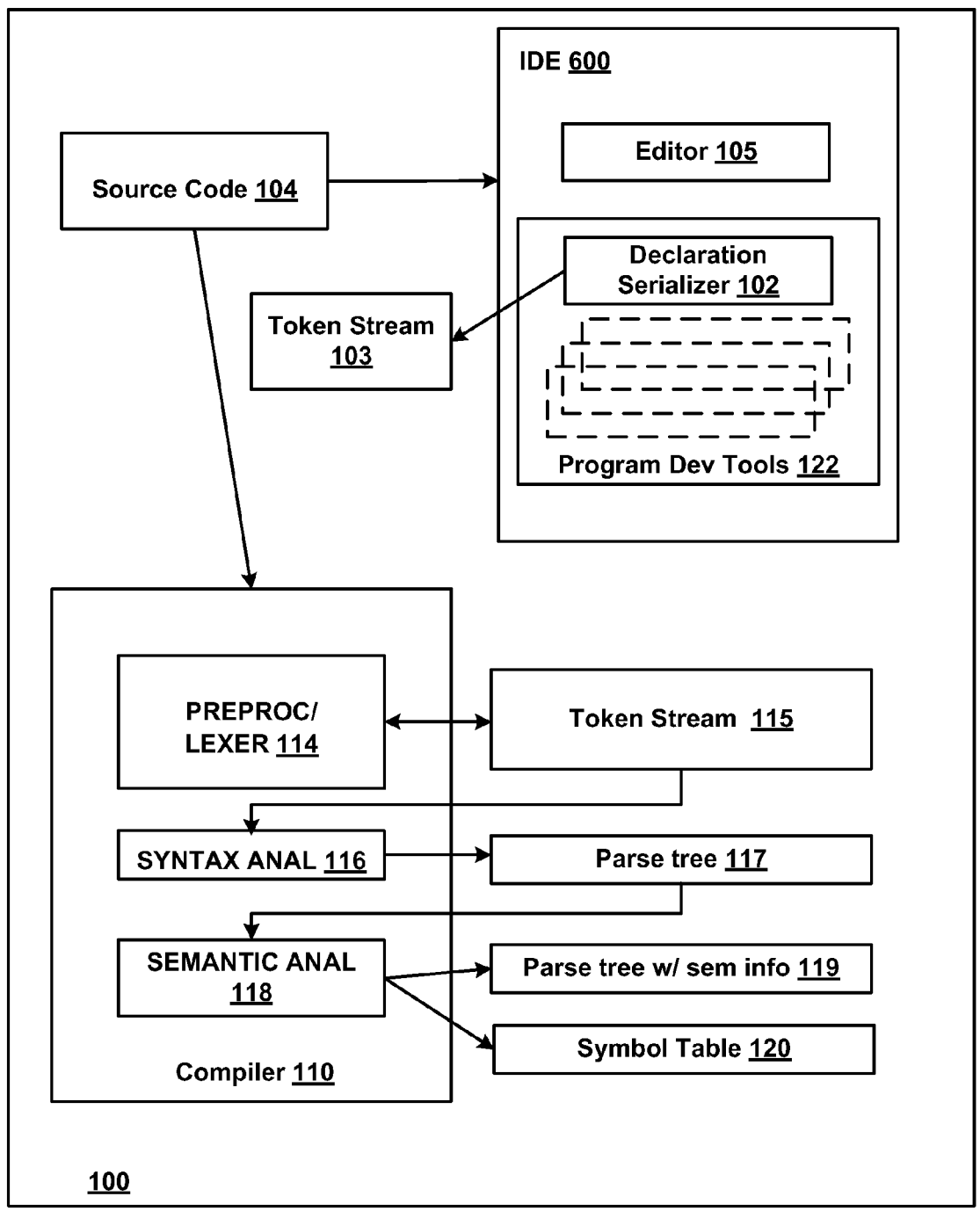
FIG. 1 is a block diagram of an example of a system for parsing declarations in preprocessor conditional branches in accordance with aspects of the subject matter disclosed herein.

For some tools such as smart editors, beautifiers, static analysis tools, refactoring tools and others, it makes sense to parse the source code that appears in all the branches of the preprocessor conditional directive statements. For example, ignoring the preprocessor conditional directive lines that interrupt declarations may be problematic.

In some programming languages a declaration specifies information about identifiers. For example, a variable declaration in C specifies the dimensions, type and other aspects of a variable. A function declaration in C specifies the return type, or the prototype (the return type and the number and type of the arguments), of a function. In some programming languages, including C, identifiers have to be declared before the variable is used or the function is called. Declaring the variable before the first time it is used allows the compiler to check that the value assigned to the variable is the right size and type. Similarly, declaring a function before the first use of the function allows the compiler to check that the correct number and type of arguments are used in the function call and that the returned value, if any, is being used correctly.

Declarations that are not definitions and declarations that are definitions can be interrupted by preprocessor directive lines. An example of an uninterrupted declaration may be:

```
#if (condition)
int var1;
#else
int var2;
#endif
```

In the above example, two variables, var1 and var2 are declared. Although there are three lines that are conditional preprocessor directive lines (e.g., #if (condition), #else and #endif), none of the three conditional preprocessor directive lines interrupt a declaration because between the key word "int" signifying or indicating the beginning of the declaration and the character ";" signifying or indicating the end of the declaration, no preprocessor conditional directives are found. If a preprocessor removes the three conditional directives lines, an unneeded variable may be declared but no syntactic error would ensue.

An example of a declaration that has been interrupted by a preprocessor directive line may be:

```
int function1
#if FOO
(int);
#else
(char *);
#endif
```

In the above example, a function "function1" is declared. The function declaration is interrupted because between the keyword "int" signifying the beginning of the function and the first end-of-declaration character (i.e., the ";" that follows "(int)"), a preprocessor conditional directive (i.e., "#if FOO") can be found. In the above example, there are two mutually exclusive alternatives caused by the presence of the preprocessor conditional directive statement interrupting the declaration because if FOO evaluates to "true", function1 is defined as "int function1(int);". If FOO evaluates to "false", function1 is defined as "int function1(char *);". Hence, the first parsing path may declare a function function1 as follows:
  int function1(int);
The second path may declare a function function1 as follows:
  int function1(char *);
Only one of these two parsing paths will operate in any one program because a first preprocessor conditional branch operates if "FOO" evaluates to "true", and a second mutually exclusive alternative preprocessor conditional (ELSE) operates in a second branch of a preprocessor conditional directive statement, causing function1 to be defined as:
  int function1(char *);
It will be appreciated that although in this example, there are two mutually exclusive preprocessor conditional directive branches and therefore two parsing paths, other preprocessor conditional directives may have additional branches and thus additional parsing paths may be followed by the declaration serializer.

A technique is provided that serializes declarations interrupted by preprocessor conditional directives. Sections of source code corresponding to mutually exclusive branches of a preprocessor conditional directive belong to different parsing paths. All parsing paths are parsed, and tokens are labeled with a parsing path identifier corresponding to the parsing path to which they belong. Preprocessor conditional directives may be nested. Thus in the case of a nested preprocessor conditional such as:

```
#if A
#if B
#else
#endif
#else
#endif
``` a first parsing path may be associated with the first branch of the first preprocessor conditional directive (#if A) and the first branch of the nested conditional directive (#if B). A second parsing path may be associated with the first branch of the first preprocessor conditional directive (#if A) and the second branch of the nested conditional directive (#else). A third parsing path may be associated with the second branch of the first preprocessor, and so on.

Parsing of Declarations in all Branches of Preprocessor Conditionals

FIG. 1 illustrates a block diagram of a system 100 for parsing declarations in preprocessor conditional directive branches. System 100 may include one or more of the following: a declaration serializer 102, input source code 104, an editor 105, an output token stream 103, a compiler 110 and/or program development tools 122. All or portions of system 100 may reside on one or more computers such as the computers described below with respect to FIG. 5. The system 100 or portions thereof may comprise a portion of an integrated design environment 600 (IDE) such as the ones described and illustrated below with respect to FIG. 6, residing on one or more computers such as the computers described with respect to FIG. 5 also described below. Alternatively, system 100 or portions thereof may be provided as a stand-alone system or as a plug-in.

A compiler such as compiler 110 may be a computer program or set of programs that translates text written in a (typically high-level) programming language (input source code 104) into another (typically lower-level) computer language (the target language). The output of the compiler may be object code (not shown). Typically the output is in a form suitable for processing by other programs (e.g., a linker), but the output may be a human-readable text file. Source code 104 is typically compiled to create an executable program but may be processed by program development tools 122 which may include tools such as editors, beautifiers, static analysis tools, refactoring tools and others that operate in background or foreground.

A compiler such as compiler 110 and/or program development tools 122 are likely to perform at least some of the following operations: preprocessing, lexical analysis, parsing (syntax analysis), semantic analysis, code generation, and code optimization.

Some languages, such as but not limited to C, typically undergo a preprocessing phase (e.g., by a preprocessor) which supports macro substitution, file inclusion and conditional compilation. Typically, a preprocessor processes and removes preprocessor directives from the source code before the lexical analysis phase. The preprocessing phase may receive a token stream generated by a lexer and output a modified token stream that does not include preprocessor directives. Lexical analysis (performed by a lexical analyzer or lexer) breaks the source code text into tokens in a token stream 115. A token is a single atomic unit of the language, such as a keyword, an identifier, a symbol name, etc. In FIG. 1 a preprocessing phase and a lexical analysis phase are shown as the same module, preprocessor/lexer 114, although it will be appreciated that a separate lexer and preprocessor may exist. Preprocessing typically occurs before syntactic or semantic analysis; e.g. in the case of C, the preprocessor may manipulate lexical tokens rather than syntactic forms. However, some languages may support macro substitutions based on syntactic forms.

A syntax analyzer such as syntax analyzer 116 may perform syntax analysis. Syntax analysis involves parsing the token sequence (e.g., token stream 115) to identify the syntactic structure of the program. The syntax analysis phase typically builds a parse tree 117. A parse tree 117 replaces the linear sequence of tokens of token stream 115 with a tree structure built according to the rules of a formal grammar which define the syntax of the programming language. The parse tree 117 is often analyzed, augmented, and transformed by later phases in the compiler.

In a semantic analysis phase performed by a semantic analyzer 118, the parse tree 117 is augmented with semantic information to generate parse tree 119. Semantic analyzer 118 typically also builds a symbol table 120. Semantic analysis performs semantic checks such as type checking (checking for type errors), or object binding (associating variable and function references with their definitions), or definite assignment (requiring all local variables to be initialized before use), and may reject incorrect programs or issue warnings. Semantic analysis usually logically precedes the code generation phase, though multiple phases may be folded into one pass over the code in some compiler implementations. It will be appreciated that compiler 110 and/or program development tools 122 may include other phases known in the art.

System 100 may include an editor 105 in which source code 104 for a computer program may be written or developed. Program development tools 122 may parse the source code 104 as the source code 104 is developed within the editor 105 at predetermined or at specified times (for example, at specified intervals or at the end of a statement or when the software development environment is inactive or idle, such as, for example when a developer pauses). Program development tools 122 may query a data source at any time and provide information in various ways to the benefit of the user and to aid in development of the program. The program development tools 122 may provide real time updated information about program elements and may provide other means to help the development of the program such as providing compilation errors and warnings, etc. as the developer is writing the program in the editor. Background compilation may not generate executable code, and/or may use a different compiler than the one used to generate executable code.

A program development tools 122 may include a lexer, preprocessor, syntax analyzer, semantic analyzer or other compiler phases that perform some or all of the functions of lexer 112, preprocessor 114, syntax analyzer 116, semantic analyzer 118, etc. but does so dynamically. A program development tools 122 may perform additional tasks as well and may provide input to the developer via editor 105 while the program source code is being developed.

The input source code 104 comprises a sequence of program instructions. Input source code 104 may be written in any programming language, whether object-oriented or imperative, in which preprocessor directives are used and which have a programming construct (e.g., a declaration or definition that declares or announces the existence of a variable, function, procedure, method, subroutine, or the like or defines a variable, function, procedure, method, etc.

Declaration serializer 102 may be integrated into one or more of the following: a compiler, a preprocessor, a lexer or a preprocessor/lexer. Declaration serializer 102 may exist as a separate entity of a compiler or may be external to a compiler. Declaration serializer 102 may be integrated into one or more of the following: a program development tool 122, a preprocessor of a program development tool 122, a lexer of a program development tool 122 or a preprocessor/lexer of program development tool 122. Declaration serializer 102 may exist as a separate entity of program development tool 122 or may be external to program development tool 122. Declaration serializer 102 may be a plug-in or standalone entity. A declaration serializer 102 may be called by a caller such as a lexer, a preprocessor, a preprocessor/lexer or a compiler or a program development tool and may return information such as but not limited to tokens to the caller.

Declaration serializer 102 may receive input source code 104 or may receive input source code that has been tokenized, (e.g., tokenized source code 115) or tokenized source code generated by program development tool 122). In accordance with aspects of the subject matter disclosed herein, the source code 104 or tokenized source code may be examined. If a declaration, definition or similar programming construct is found in the code and the declaration is interrupted by a preprocessor conditional directive, the declaration serializer may serialize each of the parsing paths induced by the mutually exclusive branches of the preprocessor conditional directive interrupting the declaration from the input into a stream of tokens. The stream of tokens produced may be generated by following each parsing path for the declaration induced by the preprocessor conditional directives in the input. A token buffer may be created that keeps track of which tokens belong to each parsing path induced by the preprocessor conditional directive. Each token of the declaration may be labeled with one or more parsing path identifiers and written to the token buffer. The tokens in the token buffer may be passed to a preprocessor, syntax analyzer (parser) or to another part or phase of a compiler or background compiler in one or more passes, as described more fully below.

To serialize a declaration, when a declaration that is interrupted by one or more preprocessor conditional directives is detected, the beginning location of the declaration in the token buffer is noted (e.g., by a pointer that points to the beginning of the declaration, or by remembering the location of the beginning of the declaration in some way). Each token that follows until the end of a first parsing path is written to the token buffer and is annotated or labeled with a first parsing path notation or identifier. When the end of the first parsing path is detected, denoted by an end-of-declaration character such as ";", the declaration serializer 102 may return to the beginning of the declaration. The declaration may be serialized again, this time proceeding through the second parsing path, annotating or labeling the tokens belonging to the second parsing path with a second parsing path notation or identifier. This operation is repeated until each of the possible parsing paths in the declaration has been exhausted.

Some preprocessor conditional predicates may not need to be evaluated and therefore may be ignored by the declaration serializer 102 (e.g., by fetching the next line of source code or the next token). A declaration serializer 102 may be able to determine when branches of a preprocessor conditional directive are mutually exclusive by matching preprocessor directives. (For example, a section of source code corresponding to a #if directive typically belongs to a different parsing path than the section of source code corresponding to the #else directive corresponding to the #if directive). Sections of source code corresponding to mutually exclusive preprocessor conditional branches belong to different parsing paths.

For example, consider the following declaration:

```
int function
#if FOO
(int);
#else
(char *);
#endif
```

It will be appreciated that there are two parsing paths in the example declaration. The first parsing path forms the declaration "int function(int);" and the second parsing path forms the declaration "int function(char *);".

Figure 2:
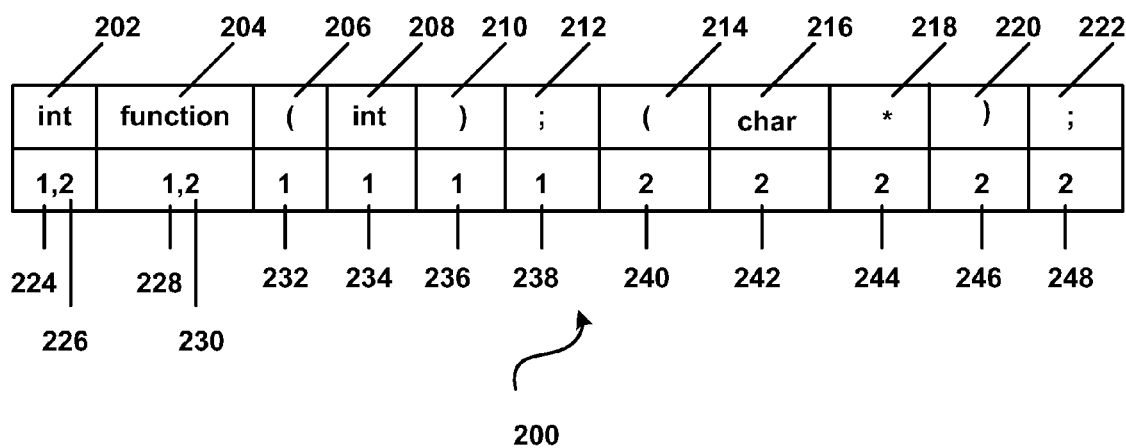
FIG. 2 is an illustration of an example of a token buffer in accordance with aspects of the subject matter disclosed herein.

In accordance with aspects of the subject matter disclosed herein, a token buffer such as token buffer 200 of FIG. 2 may be generated. The token buffer 200 may include the following: a token for keyword "int" 202, signifying the beginning of a declaration, a token 204 for the name of the function ("function1") 204. The next tokens for a first parsing path are "(" 206, "int" 208, ")" 210, and ";" 212. The token ";" 212 signifies the end of the first parsing path. Tokens "int" 202, "function1" 204, "(" 214, "char" 216, "*" 218, ")" 220 and ";" 222 are tokens of a second parsing path. Reference numerals 214-248 represent the parsing path label associated with each token by the declaration serializer. The tokens "int" 202, "function1" 204, "(" 206, "int" 208, ")" 210, and ";" 212 are all labeled as belonging to the first parsing path by labeling the listed tokens with a first parsing path identifier (e.g., in this case, with parsing path identifier 1, reference numerals 224, 228, 232, 234, 236 and 238).

Alternatively, only the first and last tokens of the first parsing path may be labeled (e.g., reference numerals 224 and 238). The tokens "int" 202, "function1" 204, "(" 214, "char" 216, "*" 218, ")" 220 and ";" 222 are labeled as belonging to the second parsing path (e.g., using reference numerals 226, 230, 240, 242, 244, 246 and 248). Alternatively, only the first and last tokens of the second parsing path may be labeled with a second parsing path identifier (e.g., using reference numerals 226 and 248). The token buffer 200 that includes the tokens for the two declarations induced by the two parsing paths may be read in successive passes and passed to a caller. The first pass may read the tokens that have been labeled with the parsing path identifier 1; the second pass may read the tokens that have been labeled with the parsing path identifier 2 and so on.

Figure 3:
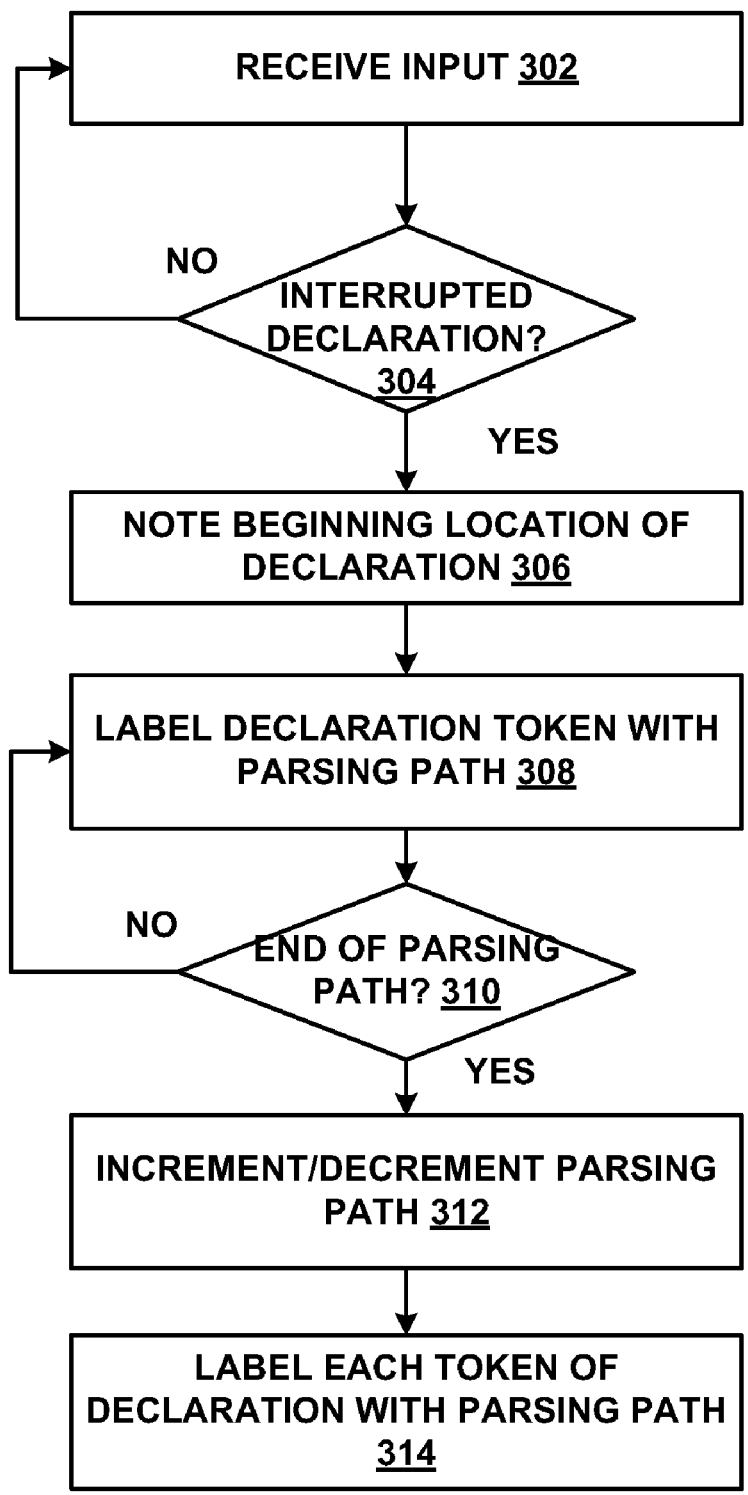
FIG. 3 is a flow diagram of an example of a method for parsing declarations in preprocessor conditional branches in accordance with aspects of the subject matter disclosed herein.

FIG. 3 illustrates a method for parsing declarations in preprocessor conditional branches in accordance with aspects of the subject matter disclosed herein. At 302 input is received. The input may be a line of source code or may be tokenized source code. That is, the input may be a token stream or the declaration serializer may perform the tokenization itself. Preprocessor conditional directives may be included in the input. If at 304, a declaration is not detected or the detected declaration is not interrupted by a preprocessor conditional directive having a plurality of parsing paths, the next input may be processed. If at 304 a declaration is detected and the declaration is interrupted by a preprocessor conditional directive having a plurality of parsing paths, and the input is recognized as the beginning of a declaration, the current location in the input may be saved or remembered in some way at 306. At 308 each token of the declaration until an end of declaration token is detected at 310, is labeled with a parsing path notation in the output token buffer. When an end of parsing path (i.e., an end of declaration indicator is detected), the parsing path may be updated (either incremented or decremented (312), for example, and the declaration may be parsed again from the beginning point saved at 306, labeling each token of the second parsing path of the declaration with the updated parsing path (314). The process described above may be repeated until all the parsing paths for the declaration have been parsed.

Figure 4:
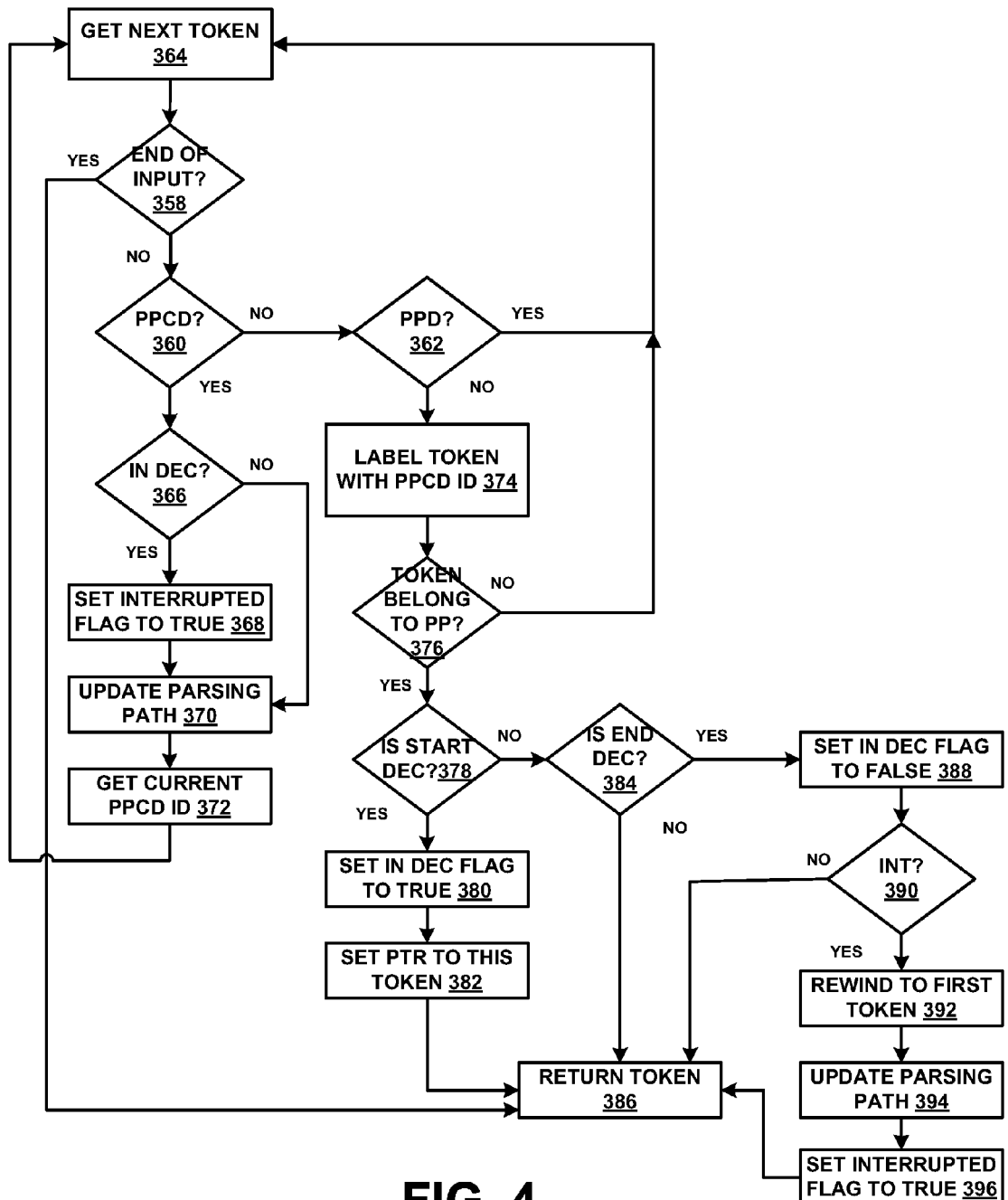
FIG. 4 is a more detailed flow diagram of an example of a method for parsing declarations in preprocessor conditional branches in accordance with aspects of the subject matter disclosed herein.

FIG. 4 illustrates a more detailed example of a flow diagram for parsing declarations in preprocessor conditional branches.

At 364 a new token is fetched. Until the end of the input is reached at 358, the following is performed. At 360, if the current token is a preprocessor conditional directive, processing may continue at 366.

At 360, if the current token is not a preprocessor conditional directive, processing may continue at 362.

If at 362, the declaration serializer determines that the current token is another type of preprocessor directive, processing may continue at 364 (the token may be skipped and the next token may be processed). If at 362, the declaration serializer determines that the current token is not another type of preprocessor directive, processing may continue at 374.

At 366, the declaration serializer determines by inspecting the declaration flag, if a declaration is being processed. If the declaration flag is set to "true", at 368, the interrupted flag may be set to "true" and processing may continue at 370. If at 366, the declaration serializer determines by inspecting the declaration flag, that a declaration is not being processed, the declaration flag may not be updated and processing may continue at 370.

At 370, a new parsing path may be created or deleted. At 372, the identifier for the currently active preprocessor conditional may be fetched. At 364 the token may be skipped and a new token may be processed, returning to 360.

At 374 the current token may be labeled with the identifier for the currently active preprocessor conditional. At 376 the serializer determines if the current token belongs to the currently active parsing path. If not, the token is skipped (364). If so, the token is returned. If the declaration serializer determines that the token denotes the beginning of a declaration at 378, processing continues at 380. If the declaration serializer determines that the token does not denote the beginning of a declaration at 378, processing continues at 384.

At 380, the declaration flag is set to "true". At 382, a pointer is set to this token so that the token buffer can be rewound to this point when the end of declaration indicator is detected for the current parsing path. When the end of declaration indicator is detected, the next token to be processed is set back to the beginning of the declaration for the next parsing path.

At 384 the declaration serializer determines if the current token denotes the end of a declaration. If not, the token may be returned to the caller at 386. If so, processing may continue at 388. At 388 the flag that denotes that the token being processed is in a declaration may be set to false. At 390, if the declaration serializer determines that the interrupted flag is set to false, the token is returned at 386. At 390, if the declaration serializer determines that the interrupted flag is set to true, the next token is set back to the beginning of the declaration at 392, the parsing path is updated at 394 and the interrupted flag is set to true at 396. Then the token is returned at 386. At 390, if the declaration serializer determines that the interrupted flag is set to false, the token may be skipped and/or returned to the caller.

Example of a Suitable Computing Environment

Figure 5:
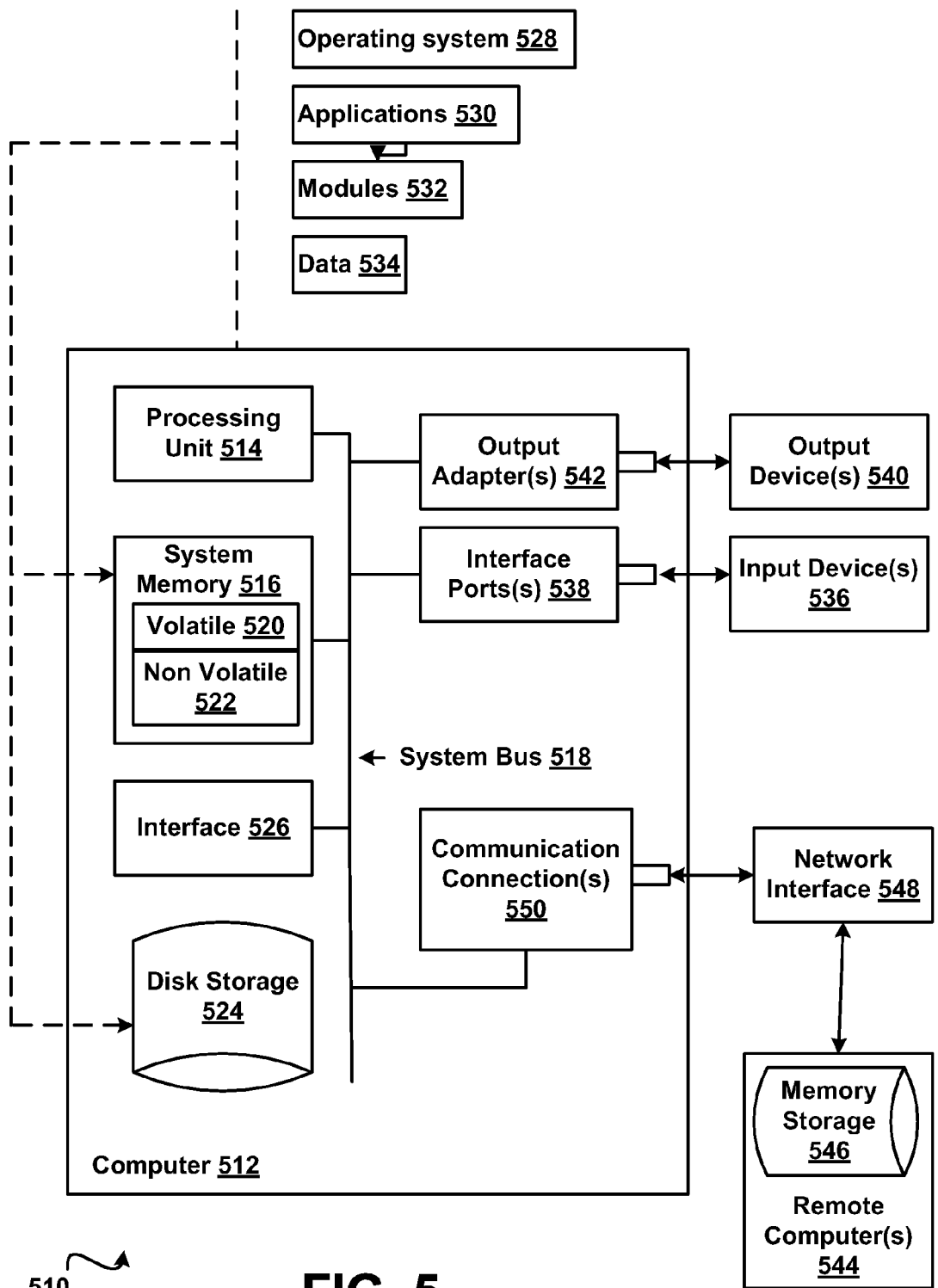
FIG. 5 is a block diagram illustrating an example of a computing environment in which aspects of the subject matter disclosed herein may be implemented.

In order to provide context for various aspects of the subject matter disclosed herein, FIG. 5 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 5, a general purpose computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512.

It will be appreciated that FIG. 5 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combination s of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 5. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 6:
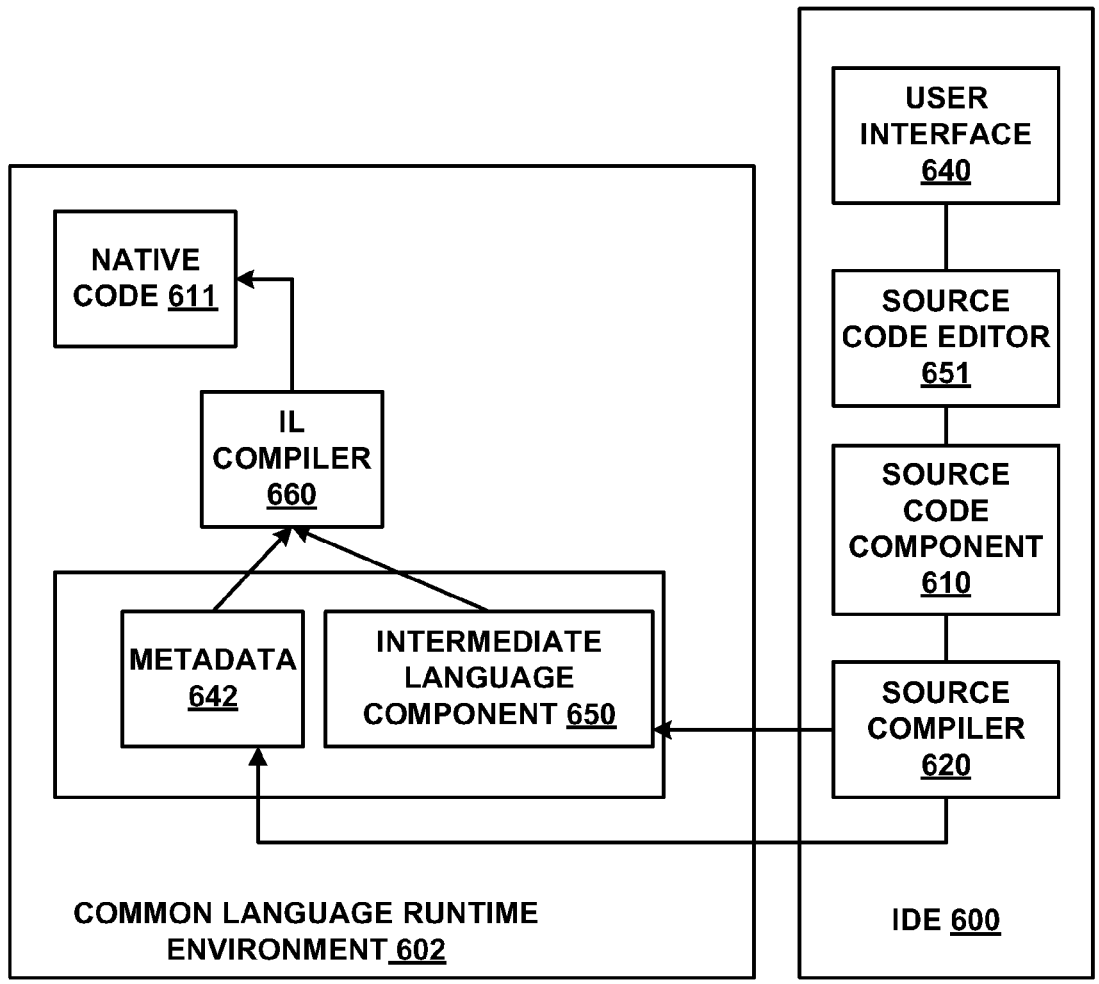
FIG. 6 is a block diagram of an example of an integrated development environment in accordance with aspects of the subject matter disclosed herein.

FIG. 6 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system that parses a plurality of preprocessor conditional branches of a preprocessor conditional directive statement comprising:
   a computer comprising a processor and a memory, the computer further comprising:
   a declaration serializer that:
   obtains tokenized input;
   in response to determining that the tokenized input represents a declaration, wherein the declaration is interrupted by a preprocessor conditional directive of a preprocessor conditional directive statement, wherein the preprocessor conditional directive statement comprises a plurality of mutually exclusive branches comprising at least a first branch and a second branch;
   labels each token of the interrupted declaration with at least a first parsing path indicator of a plurality of parsing path indicators, the at least first parsing path indicator corresponding to a first parsing path, and wherein a second parsing path indicator corresponds to a second parsing path, wherein each of the plurality of parsing paths is induced by the plurality of mutually exclusive branches of the preprocessor conditional directive statement; and
   returns the tokens labeled with the at least first parsing path indicator in a first pass to a caller.

2. The system of claim 1, wherein the caller comprises a compiler, a program development tool, a lexer, a syntax analyzer, a preprocessor or a preprocessor/lexer.

3. The system of claim 1, wherein a token buffer is generated by the declaration serializer, the token buffer comprising a plurality of tokens of the declaration, wherein each token of the plurality of tokens of the declaration is labeled with at least one parsing path indicator corresponding to a parsing path to which each token belongs.

4. The system of claim 1, wherein the declaration serializer detects an interrupted declaration by detecting a beginning of declaration indicator, an end of declaration indicator and a preprocessor conditional directive between the beginning of declaration indicator and the end of declaration indicator.

5. The system of claim 4, wherein in response to detecting an end of declaration indicator, the declaration serializer returns to a beginning of the declaration and serializes tokens of a next parsing path.

6. The system of claim 1, wherein parsing paths induced by mutually exclusive branches of the preprocessor conditional directive statement are detected by matching preprocessor conditional directives of the preprocessor conditional directive statement.

7. A method of parsing a plurality of preprocessor conditional branches of a preprocessor conditional directive statement comprising:
   obtaining tokenized input;
   in response to determining that the tokenized input represents a declaration, wherein the declaration is interrupted by a preprocessor conditional directive of a preprocessor conditional directive statement, wherein the preprocessor conditional directive statement comprises a plurality of mutually exclusive branches comprising at least a first branch and a second branch;
   using a processor, labeling each token of the interrupted declaration with at least a first parsing path indicator of a plurality of parsing path indicators, the at least first parsing path indicator corresponding to a first parsing path, and wherein a second parsing path indicator corresponds to a second parsing path, wherein each of the plurality of parsing paths is induced by the plurality of mutually exclusive branches of the preprocessor conditional directive statement; and
   returning the tokens labeled with the at least first parsing path indicator in a first pass to a caller.

8. The method of claim 7, further comprising:
   returning the tokens labeled with the second parsing path indicator in a second pass to the caller.

9. The method of claim 7, further comprising:
   storing a location of a beginning of the interrupted declaration, detecting an end of declaration indicator of the first path, and in response to detecting the end of declaration indicator of the first parsing path, serializing the interrupted declaration again by starting at the beginning of the interrupted declaration and processing the tokens belonging to the second parsing path.

10. The method of claim 9, further comprising:
    generating a token buffer to keep track of tokens belonging to the first parsing path and tokens belonging to the second parsing path.

11. A computer-readable storage medium storing computer-executable instructions which when executed cause a computing environment to:
- obtain tokenized input representing a declaration;
- in response to determining that the tokenized input represents a declaration, wherein the declaration is interrupted by a preprocessor conditional directive of a preprocessor conditional directive statement, wherein the preprocessor conditional directive statement comprises a plurality of mutually exclusive branches comprising at least a first branch and a second branch,
- label each token of the interrupted declaration with at least a first parsing path indicator of a plurality of parsing path indicators, the at least first parsing path indicator corresponding to a first parsing path, and wherein a second parsing path indicator corresponds to a second parsing path, wherein each of the plurality of parsing paths is induced by the plurality of mutually exclusive branches of the preprocessor conditional directive statement;
- store the labeled tokens in a token buffer; and
- return the tokens labeled with the at least first parsing path indicator to a caller in a first pass of the token buffer and return the tokens labeled with the second parsing path indicator to the caller in a second pass of the token buffer.

12. The computer-readable storage medium of claim 11, storing further computer-executable instructions, which when executed cause the computing environment to:
- store a location of a beginning of the interrupted declaration.

13. The computer-readable storage medium of claim 12, storing further computer-executable instructions, which when executed cause the computing environment to:
- detecting an end of declaration indicator of the first parsing path, and in response to detecting the end of declaration indicator of the first parsing path, serialize the declaration again by starting at the location of the beginning of the interrupted declaration and processing the tokens belonging to the second parsing path.

14. The computer-readable storage medium of claim 13, storing further computer-executable instructions, which when executed cause the computing environment to:
- determine that the first parsing path and the second parsing path are parsing paths induced by mutually exclusive branches of the preprocessor conditional directive statement by matching preprocessor conditional directives of the preprocessor conditional directive statement.

15. The computer-readable storage medium of claim 11, storing further computer-executable instructions, which when executed cause the computing environment to:
- return the tokens to a compiler.

16. The computer-readable storage medium of claim 11, storing further computer-executable instructions, which when executed cause the computing environment to:
- return the tokens to a program development tool.

17. The computer-readable storage medium of claim 16, storing further computer-executable instructions, which when executed cause the computing environment to:
- return the tokens to a preprocessor/lexer.

18. The computer-readable storage medium of claim 11, storing further computer-executable instructions, which when executed cause the computing environment to:
- return the tokens to a lexer.

19. The computer-readable storage medium of claim 11, storing further computer-executable instructions, which when executed cause the computing environment to:
- return the tokens to a preprocessor.

* * * * *